No. 718,757. PATENTED JAN. 20, 1903.
W. S. GRAHAM.
CLAMP.
APPLICATION FILED NOV. 14, 1902.
NO MODEL.
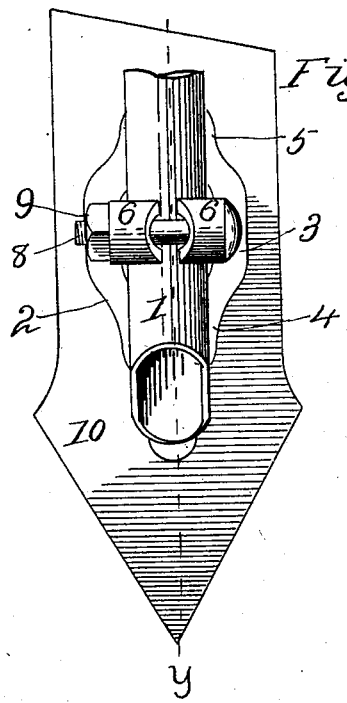
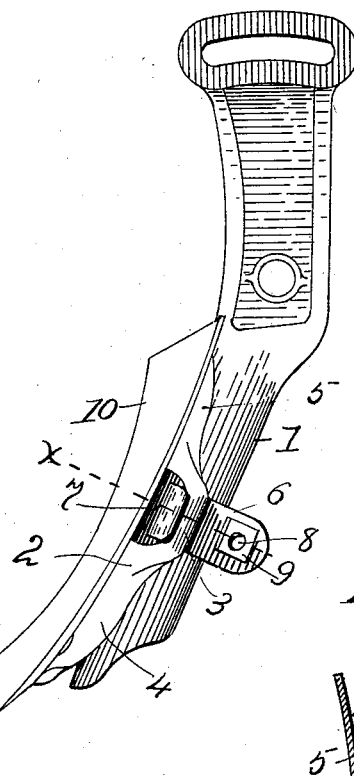
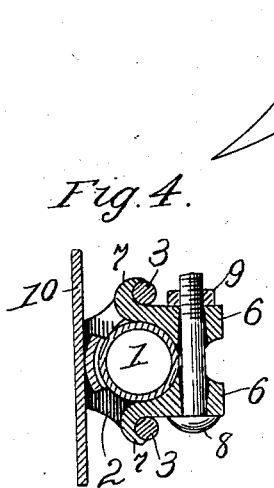
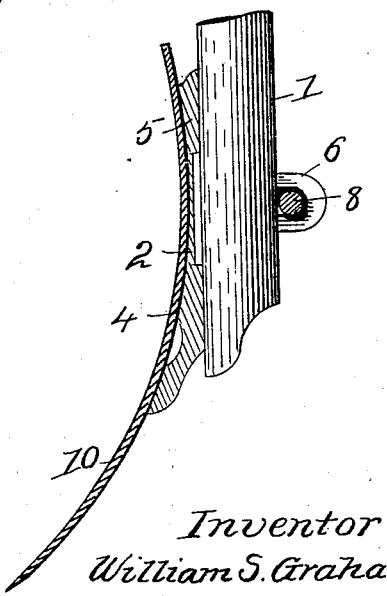
Witnesses.
Hora Graham.
Fary Graham.
Inventor
William S. Graham
by L. P. Graham
his attorney.

UNITED STATES PATENT OFFICE.

WILLIAM S. GRAHAM, OF CANTON, ILLINOIS, ASSIGNOR TO PARLIN & ORENDORFF COMPANY, OF CANTON, ILLINOIS, A CORPORATION OF ILLINOIS.

CLAMP.

SPECIFICATION forming part of Letters Patent No. 718,757, dated January 20, 1903.

Application filed November 14, 1902. Serial No. 131,401. (No model.)

*To all whom it may concern:*

Be it known that I, WILLIAM S. GRAHAM, of the city of Canton, county of Fulton, and State of Illinois, have invented certain new and useful Improvements in Clamps, of which the following is a specification.

This invention is particularly applicable to clamping shovels to the shanks of cultivators; but it may be used wherever it is desirable to clamp an object firmly to a round shaft or bearing.

The object is to combine simplicity with security in clamps used to secure parts to circular bearings at various angles therewith.

The invention is exemplified in the structure hereinafter described, and it is defined in the appended claims.

In the drawings forming part of this specification, Figure 1 is a side elevation of a cultivator-shank, showing a shovel attached to the shank by means of my improved clamp. Fig. 2 is a rear elevation of a shovel secured to a shank by means of my clamp, the upper end of the shank being broken away. Fig. 3 is a section on line Y in Fig. 2. Fig. 4 is a section on line X in Fig. 1.

The rounded end of the cultivator-shank is shown at 1, and a clamp-plate is shown at 2. The clamp-plate is elongated and concaved lengthwise to conform to the convexity of the shank. Slots are made in the sides of the plate at or near the longitudinal center thereof, and hitch-bearings 3 result from the slots. The concaved ends 4 and 5 of plate 2 line up with the shank and bear against the same; but the central part of the concavity of the plate is set back out of contact with the rounded bearing 1, as shown in Figs. 3 and 4. A pair of clamp-clips 6 are concaved to embrace or bear against the rounded surface of shank 1. They have hooks 7, which are adapted to engage the hitch-bearings 3 of the clamp-plate, and they are bored in the ends opposite hooks 7 to receive bolt 8. The bolt 8 is threaded and is provided with a head on one end and a nut on the other end. The bolt is used to draw the free ends of the clips 6 toward each other and against the shank-bearing, and the pressure so developed forces the rounded bearing against the concaved surface of plate 1 and clamps it firmly between the clips and the plate. The clips bear against two sides of the shank-bearing, while the plate bears against a third side, and the pressure is thus presented in three different directions. This distribution of pressure gives the best possible results in clamping the rounded end of the shank against turning in the clamp or the clamp from turning on the rounded shank, and the stress of the clamp is increased by the distribution of the pressure lengthwise of the rounded bearing. The clips press the rounded shank toward the plate at the longitudinal center thereof, while the plate resists the pressure at its ends 4 and 5. This arrangement gives a three-point bearing to the clamp lengthwise of the rounded shank, as well as circumferentially thereof, and the tendency is to spring the shank slightly between points 4 and 5 and the clips, and thereby make the connection more secure.

In this instance the clamp-plate 2 is attached to a shovel 10, and the rounded bearing 1 is on the lower end of a cultivator-shank; but it is obvious that the plate and clips will effectively embrace any cylindrical object of proper size and will securely hold anything in connection therewith and at any desired angle.

I claim—

1. In a clamp to embrace cylindrical objects, the combination of a concaved plate having hitch-bearings between its ends, a pair of clips each having a hook to engage a hitch-bearing of the plate and a bolt to draw the clips together.

2. A clamp to embrace cylindrical objects, comprising an elongated plate concaved lengthwise, hitch-bearings in the sides of the plate between the ends thereof, a pair of clips each bored through one end and provided with a hook at the other end, and a bolt to extend through the clips and draw them together.

3. A clamp to embrace cylindrical objects, comprising an elongated plate concaved lengthwise and cut away or set back between its ends, hitch-bearings in the sides of the plate between the ends thereof, a pair of clips each bored through one end and provided with a hook at the other end, and a bolt to extend through the clips and draw them together.

In testimony whereof I sign my name in the presence of two subscribing witnesses.

WM. S. GRAHAM.

Witnesses:
WALTER B. BARNEY,
WILLIAM E. MCFARLAND.